(12) United States Patent
Ishizuka et al.

(10) Patent No.: US 10,811,746 B2
(45) Date of Patent: Oct. 20, 2020

(54) WAVEGUIDE TUBE CONNECTION DEVICE AND CLAMP FOR WAVEGUIDE TUBE CONNECTION

(71) Applicant: MICROWAVE CHEMICAL CO., LTD., Osaka (JP)

(72) Inventors: Akinori Ishizuka, Osaka (JP); Hisao Watanabe, Osaka (JP)

(73) Assignee: MICROWAVE CHEMICAL CO., LTD., Osaka (JP)

( * ) Notice: Subject to any disclaimer, the term of this patent is extended or adjusted under 35 U.S.C. 154(b) by 40 days.

(21) Appl. No.: 16/322,066

(22) PCT Filed: Jul. 25, 2017

(86) PCT No.: PCT/JP2017/026923
§ 371 (c)(1),
(2) Date: Feb. 26, 2019

(87) PCT Pub. No.: WO2018/025710
PCT Pub. Date: Feb. 8, 2018

(65) Prior Publication Data
US 2019/0190105 A1 Jun. 20, 2019

(30) Foreign Application Priority Data

Aug. 5, 2016 (JP) ................................. 2016-154524

(51) Int. Cl.
*H01P 1/04* (2006.01)
*F16L 23/032* (2006.01)
*H01P 3/12* (2006.01)

(52) U.S. Cl.
CPC ............ *H01P 1/042* (2013.01); *F16L 23/032* (2013.01); *H01P 1/04* (2013.01); *H01P 3/12* (2013.01); *F16B 2200/509* (2018.08)

(58) Field of Classification Search
CPC .... H01P 1/042; H01P 1/04; H01P 3/12; F16L 23/032; F16L 23/14; F16L 23/036; F16B 2200/509; F16B 2/065
(Continued)

(56) References Cited

U.S. PATENT DOCUMENTS 2,738,207 A    3/1956  Twigg, Jr.
3,390,901 A *  7/1968  Bibb ...................... H01P 1/042
                                                     285/406
(Continued)

FOREIGN PATENT DOCUMENTS

JP          82802/1980      6/1980
JP          3-85901 A       4/1991
(Continued)

OTHER PUBLICATIONS

International Search Report and Written Opinion for Application No. PCT/JP2017/026923 dated Oct. 10, 2017.
Written Opinion for International Application No. PCT/JP2017/026923 dated Oct. 10, 2017.
Supplementary European Search Report issued in corresponding European Patent Application No. EP 17 83 6816 dated Feb. 24, 2020.

*Primary Examiner* — Rakesh B Patel
*Assistant Examiner* — Jorge L Salazar, Jr.
(74) *Attorney, Agent, or Firm* — Troutman Pepper Hamilton Sanders LLP

(57) ABSTRACT

A waveguide connecting apparatus including two waveguide connecting clamps each including a pair of clamp pieces positioned to oppose each other and sandwich outer peripheral portions of flanges positioned to oppose each other. A fastener pressing the pair of clamp pieces against the outer peripheral portions of the flanges. Each clamp piece includes two abutting members having first faces abutting against faces on the opposite side of faces that oppose each other of the flanges positioned to oppose each other. Second faces abutting against side faces of the waveguides, and third faces serving as tapered faces of the flanges, on the opposite (Continued)

side of the faces opposing each other. A pressing member with a substantially V-shaped cross section, having two inclined faces engaging with the respective third faces of the abutting members, and holding the two abutting members such that the two abutting members are respectively movable in the directions of inclination of the inclined faces with which the two abutting members respectively engage. The two waveguide connecting clamps are positioned such that directions in which the pairs of clamp pieces oppose each other intersect each other.

7 Claims, 8 Drawing Sheets

(58) Field of Classification Search
USPC .............. 333/24 R, 245, 248, 254, 255, 260
See application file for complete search history.

(56) References Cited

U.S. PATENT DOCUMENTS

| | | | |
|---|---|---|---|
| 4,313,625 A | | 2/1982 | West |
| 4,864,260 A | * | 9/1989 | Huard .................... H01P 1/042 |
| | | | 333/255 |
| 7,134,651 B1 | | 11/2006 | Beck |

FOREIGN PATENT DOCUMENTS

| | | |
|---|---|---|
| JP | 1998-135701 A | 5/1998 |
| JP | 2010-21923 A | 1/2010 |

* cited by examiner

WAVEGUIDE TUBE CONNECTION DEVICE AND CLAMP FOR WAVEGUIDE TUBE CONNECTION

CROSS REFERENCE TO RELATED APPLICATIONS

This application is a National Stage of International Application PCT/JP2017/026923 filed Jul. 25, 2017 and published as WO 2018/025710 on Feb. 8, 2018. The International Application claims priority to Japanese Application No. 2016-154524 filed Aug. 5, 2016. All of the above applications are incorporated herein by reference in their entirety.

TECHNICAL FIELD

The present invention relates to an apparatus that connects waveguides, and so on.

BACKGROUND

As conventional technology, there is a known waveguide connecting apparatus that connects waveguides that are to be connected to each other, by forming flanges at ends of the waveguides, and positioning the flanges so as to overlap each other. The wave guide connecting apparatus includes a coupling clamp that includes: a clamp piece that has a V-shaped cross section, and engages with tapered faces that are provided on the opposite side of mating faces of the flanges; and a fastening unit that presses the clamp piece against the tapered faces (for example, see JP H10-135701A (Page 1, FIG. 1, etc.)).

However, according to the above-described conventional technology, there is the problem of poor workability when waveguides are to be connected.

For example, the faces on the opposite side of the mating faces of the flanges of typical waveguides are flat faces that are orthogonal to the waveguides, and therefore, in order to apply the above-described conventional technology to typical waveguides, it is necessary to separately position a tapered-face forming member or the like for providing tapered faces on the opposite side of the mating faces of the flanges, which requires additional work to be performed to place the tapered-face forming member or the like, and increases the number of parts used for connection. Thus, there is the problem of poor workability.

Also, for example, if special waveguides whose faces on the opposite side of the mating faces of the flanges are tapered faces are to be used, it is necessary to newly design such waveguides and replace existing typical waveguides with them. Therefore, it is impossible to easily improve workability, using typical waveguides.

The present invention has been made to solve such problems, and aims to provide a waveguide connecting apparatus and so on with which workability can be easily improved when waveguides are to be connected to each other.

SUMMARY

A waveguide connecting apparatus according to the present invention is a waveguide connecting apparatus that connects a pair of waveguides that respectively have flanges at ends, such that the flanges oppose each other, the waveguide connecting apparatus including two waveguide connecting clamps, each including: a pair of clamp pieces that are to be positioned so as to oppose each other and sandwich outer peripheral portions of the flanges that are positioned so as to oppose each other such that the pair of waveguides are in communication with each other; and a fastening unit that presses the pair of clamp pieces against the outer peripheral portions of the flanges. Each clamp piece includes: a pair of abutting members that are to be positioned so as to sandwich the flanges that are positioned so as to oppose each other, from faces that are on the opposite side of faces that oppose each other, the pair of abutting members respectively having first faces that abut against the faces that are on the opposite side, second faces that abut against side faces of the waveguides, and third faces that serve as tapered faces of the flanges, on the opposite side of the faces that oppose each other; and a pressing member with a substantially V-shaped cross section, having two inclined faces that engage with the respective third faces of the pair of abutting members, and holding the pair of abutting members such that the pair of abutting members are respectively movable in the directions of inclination of the inclined faces with which the pair of abutting members respectively engage, and the two waveguide connecting clamps are positioned such that directions in which the pairs of clamp pieces of the clamps oppose each other intersect each other.

With such a configuration, the pair of abutting members are held so as to be movable in the directions of inclination of the inclined faces of the pressing member with which the pair of abutting members engage. Therefore, there is no need to position the abutting members relative to the flanges in advance, and it is possible to improve workability when connecting waveguides to each other. Also, there is no need to use special waveguides that have tapered faces on the flanges, and therefore it is possible to easily improve workability, using conventional waveguides.

Also, a waveguide connecting apparatus according to the present invention is the above-described waveguide connecting apparatus, wherein each inclined face of the pressing member has one or more penetrating grooves that extend in the direction of inclination of the inclined face, the third faces of the abutting members are respectively provided with rod-shaped members that penetrate through the penetrating grooves, the rod-shaped members are provided with anti-fall structures that are positioned on the opposite side relative to the abutting members and prevent the rod-shaped members from falling off the penetrating grooves, and the abutting members of the clamp piece is held by the pressing member so as to be movable due to the penetrating grooves and the rod-shaped members that have the anti-fall structures.

With such a configuration, the abutting members can be held so as to be movable relative to the inclined faces of the pressing member. Therefore, it is possible to easily improve workability when connecting waveguides to each other.

Also, a waveguide connecting apparatus according to the present invention is the above-described waveguide connecting apparatus, wherein each clamp piece further includes a biasing unit that biases the abutting members outward of the pressing member.

With such a configuration, the abutting members are located outside the pressing member until the clamp piece is pressed against it. Therefore, it is possible to further improve workability.

Also, a waveguide connecting apparatus according to the present invention is the above-described waveguide connecting apparatus, further including: a frame that is to be positioned so as to surround the flanges, wherein the fastening unit of each of the waveguide connecting clamps has a screw that pushes out at least one of the pair of clamp pieces of the waveguide connecting clamp via the frame.

With such a configuration it is possible to connect waveguides by pushing out the clamp piece to press the flanges against each other, using the screw and fastening the waveguide connecting clamp.

Also, a waveguide connecting apparatus according to the present invention is the above-described waveguide connecting apparatus, wherein the two waveguide connecting clamps are positioned such that directions in which the pairs of clamp pieces of the clamps oppose each other are substantially orthogonal to each other.

With such a configuration, it is possible to appropriately connect rectangular waveguides or the like to each other.

Also, a waveguide connecting apparatus according to the present invention is the above-described waveguide connecting apparatus, wherein at least one of: the third faces of the abutting members; and the inclined faces of the pressing member, which engage with the third faces of the abutting members, are made of polytetrafluoroethylene.

With such a configuration, it is possible to smoothly move the abutting members along the inclined faces of the pushing member, and easily perform work when fastening the clamp piece.

A waveguide connecting clamp according to the present invention is a waveguide connecting clamp for connecting a pair of waveguides that respectively have flanges at ends, such that the flanges oppose each other, the waveguide connecting clamp including a pair of clamp pieces that are to be positioned so as to oppose each other and sandwich outer peripheral portions of the flanges that are positioned so as to oppose each other such that the pair of waveguides are in communication with each other; and a fastening unit that presses the pair of clamp pieces against the outer peripheral portions of the flanges. Each clamp piece includes: a pair of abutting members that are to be positioned so as to sandwich the flanges that are positioned so as to oppose each other, from faces that are on the opposite side of faces that oppose each other, the pair of abutting members respectively having first faces that abut against the faces that are on the opposite side, second faces that abut against side faces of the waveguides, and third faces that serve as tapered faces of the flanges, on the opposite side of the faces that oppose each other; and a pressing member with a substantially V-shaped cross section, having two inclined faces that engage with the respective third faces of the pair of abutting members, and holding the pair of abutting members such that the pair of abutting members are respectively movable in the directions of inclination of the inclined faces with which the pair of abutting members respectively engage.

With such a configuration, the pair of abutting members are held so as to be movable in the directions of inclination of the inclined faces of the pressing member with which the pair of abutting members engage. Therefore, there is no need to position the abutting members relative to the flanges in advance, and it is possible to easily improve workability when connecting waveguides to each other.

With the waveguide connecting apparatus and so on according to the present invention, workability can be easily improved when waveguides are to be connected to each other.

DETAILED DESCRIPTION

Figure 1A:
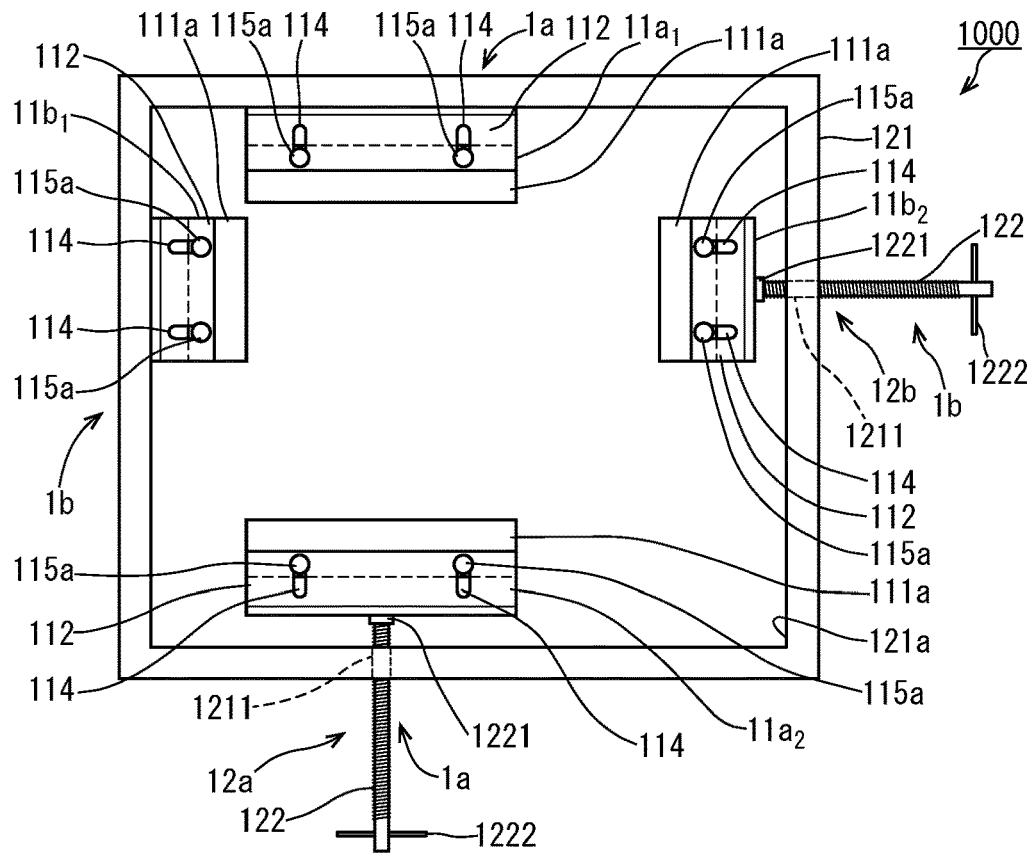
FIG. 1 includes a plan view (FIG. 1A) and a perspective view (FIG. 1B) of a waveguide connecting apparatus according to an embodiment of the present invention.

The following describes an embodiment of the waveguide connecting apparatus and so on with reference to the drawings. Note that constituent elements that are assigned the same reference numerals in the embodiment act in a similar manner, and redundant descriptions may be omitted.

Figure 1B:
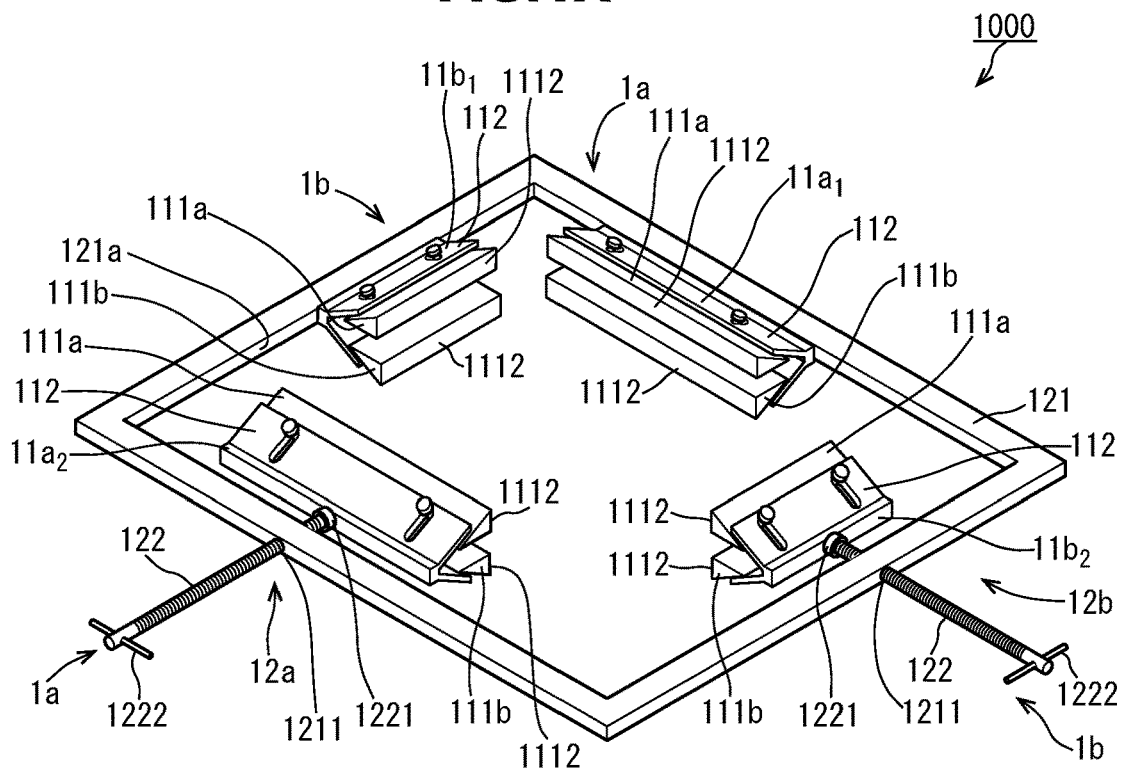

FIG. 1 includes a plan view (FIG. 1A) and a perspective view (FIG. 1B) of a waveguide connecting apparatus 1000 according to the present embodiment.

Figure 2A:
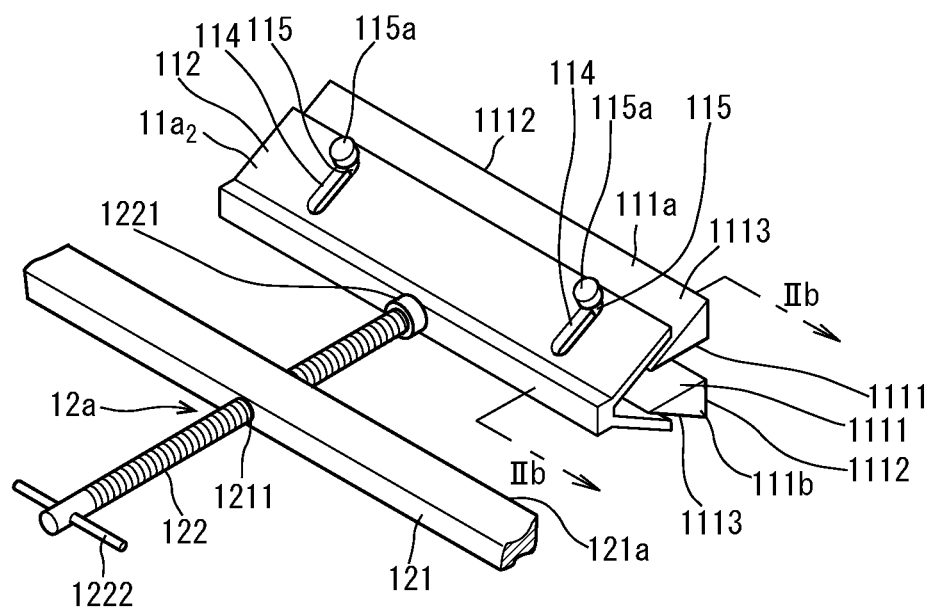
FIG. 2 includes a perspective view (FIG. 2A) and a cross-sectional view along a line IIb-IIb (FIG. 2B) of a main part of the waveguide connecting apparatus.
Figure 2B:
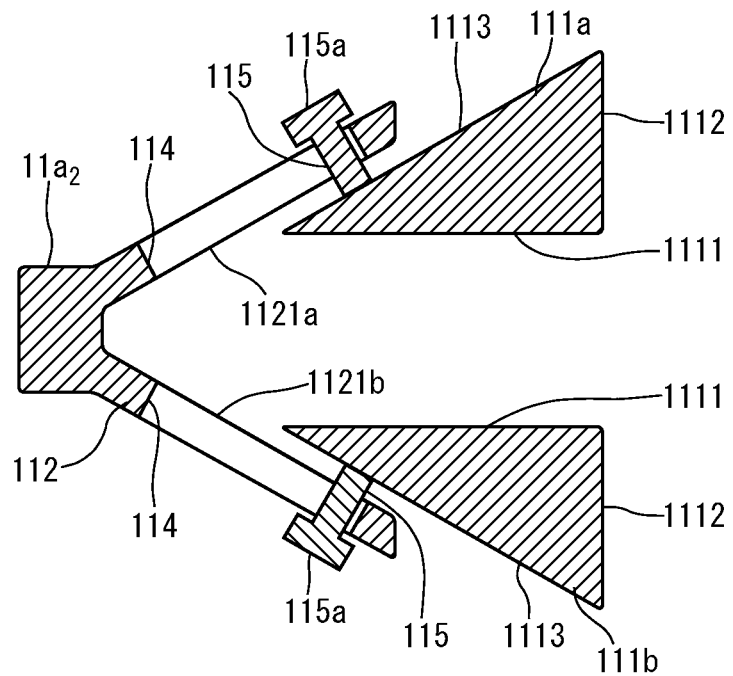

FIG. 2 includes a perspective view (FIG. 2A) and a cross-sectional view along a line IIb-IIb (FIG. 2B) of a main part of the waveguide connecting apparatus 1000.

Figure 3A:
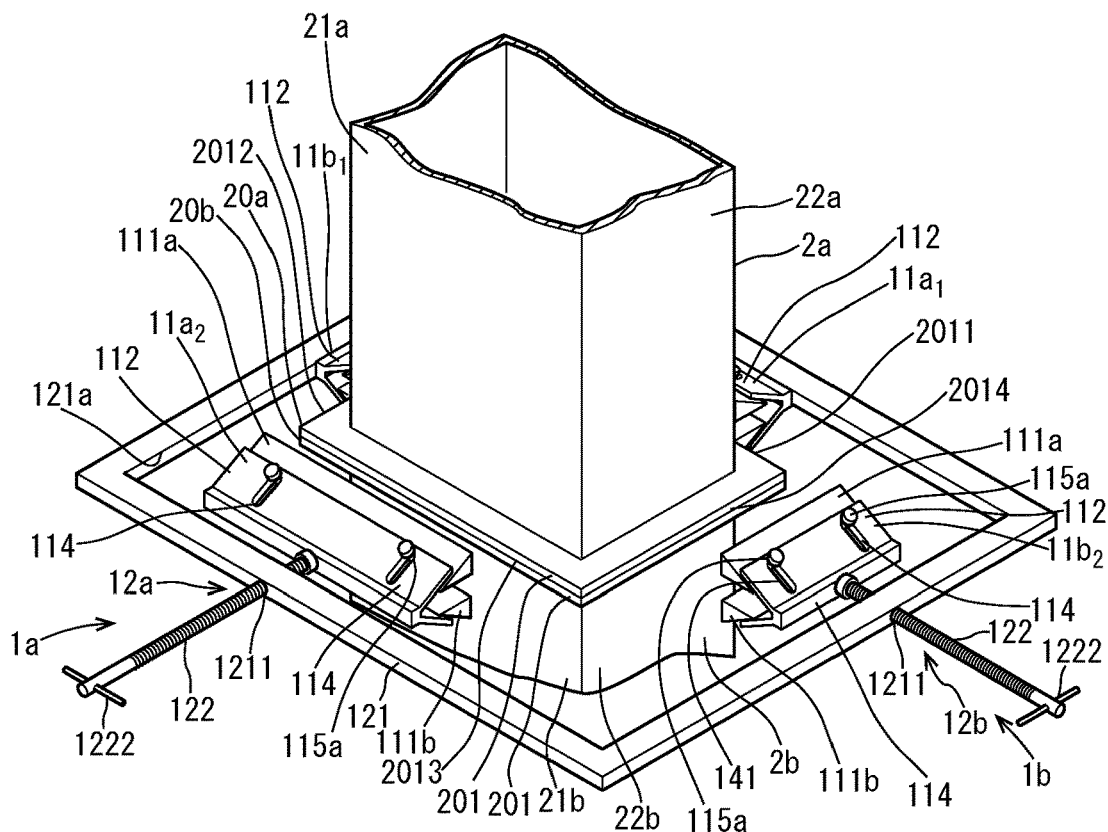
FIG. 3 includes a perspective view (FIG. 3A) of the waveguide connecting apparatus positioned around flanges that are positioned so as to oppose each other such that waveguides are in communication with each other, and a perspective view (FIG. 3B) showing the waveguides connected to each other by the waveguide connecting apparatus.
Figure 3B:
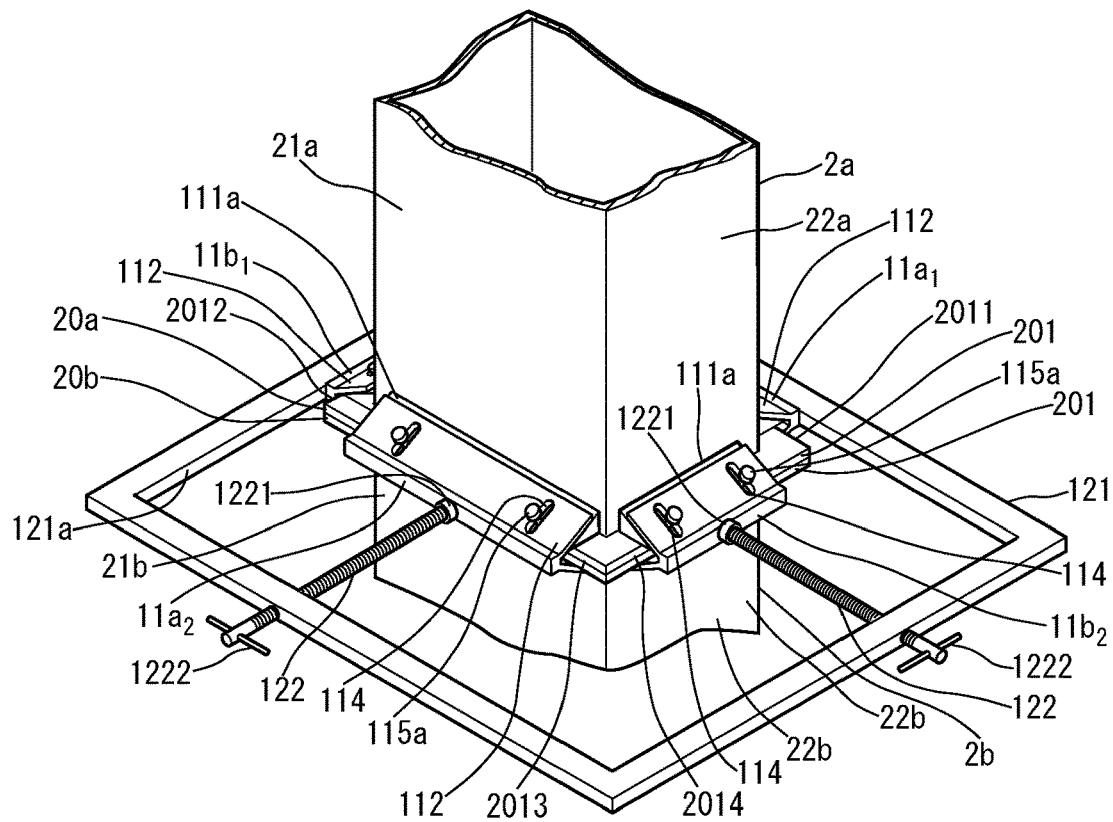

FIG. 3 includes a perspective view (FIG. 3A) of the waveguide connecting apparatus 1000 positioned around flanges that are positioned so as to oppose each other such that waveguides are in communication with each other, and a perspective view (FIG. 3B) showing the waveguides connected to each other by the waveguide connecting apparatus 1000.

Figure 4A:
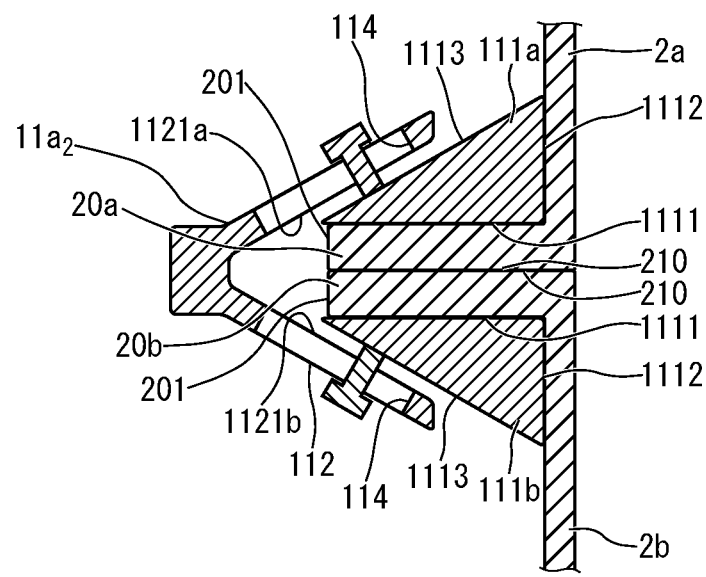
FIG. 4 includes a cross-sectional view (FIG. 4A) of the main part of the waveguide connecting apparatus, showing that abutting members of the waveguide connecting apparatus are positioned so as to abut against: flanges that are positioned so as to oppose each other such that waveguides are in communication with each other; and side faces of the waveguides, and a cross-sectional view (FIG. 4B) of the main part against which a pressing member of the waveguide connecting apparatus is pressed.
Figure 4B:
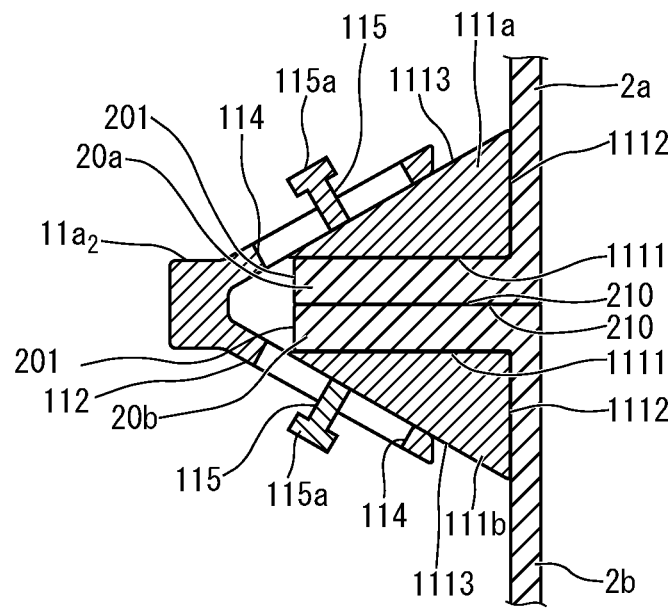

FIG. 4 includes a cross-sectional view (FIG. 4A) of a main part of the waveguide connecting apparatus, showing that abutting members of the waveguide connecting apparatus are positioned so as to abut against: flanges that are positioned so as to oppose each other such that waveguides are in communication with each other; and side faces of the waveguides, and a cross-sectional view (FIG. 4B) of the main part against which a pressing member is pressed. The cross sections shown in FIGS. 4A and 4B are cross sections along a position similar to that in FIG. 2B.

The waveguide connecting apparatus 1000 is an apparatus that connects a waveguide 2a that has a flange 20a at at least one end, and a waveguide 2b that has a flange 20b at at least one end, to each other such that the flange 20a and the flange 20b oppose each other. The waveguide connecting apparatus 1000 may be, for example, an apparatus that connects the waveguides 2a and 2b such that microwaves or the like that are guided in the waveguides do not leak, or an apparatus that keeps the waveguides 2a and 2b airtight. For the sake of description, the waveguides 2a and 2b may simply be referred to as waveguides 2 when they need not be distinguished from each other. Also, the waveguides 2a and 2b may be collectively referred to as a pair of waveguides 2. Also, the waveguides 2a and 2b may be collectively referred to as a pair of waveguides 2. The waveguides 2 are rectangular waveguides that have a rectangular cross section. The waveguides 2 are hollow waveguides. The waveguides 2 are waveguides that are used to transmit microwaves, for example. There are no restrictions on the size of the cross section and the aspect ratio of the waveguides 2. Also, there are no restrictions on the length or the like of the waveguides 2. Also, there are no restrictions as to whether or not the waveguides 2 are bent. Preferably, the waveguides 2 conform to standards for common waveguides, such as standards for waveguides for microwaves.

Outer peripheral portions 201 of the flanges 20a and 20b are substantially rectangular in plan view. A substantially rectangular shape may be a rectangular shape, a rectangular shape with rounded corners, or a rectangular shape that has a cutout or the like in at least a portion thereof. The outer peripheral portions 201 of the flanges 20a and 20b can be regarded as, for example, edge portions or the like of the flanges 20a and 20b. The flanges 20a and 20b may simply be referred to as flanges 20 when they need not be distinguished from each other. There are no restrictions on the size and the aspect ratio of the outer peripheral portions 201 in plan view. Also, there are no restrictions on the thickness or the like of the flanges 20. The flanges 20 are provided so as to be orthogonal to side faces of the waveguides 2, for example. The flanges 20 are provided so as to extend in a direction that is orthogonal to side faces of the waveguides 2, for example. The side faces of the waveguides 2 are, for example, faces that extend in a direction in which the waveguides 2 extend. For example, the waveguides 2 are rectangular waveguides, and each have at least four side faces at least in the vicinity of the flanges 20. The outer peripheral portions 201 of the flanges 20 each have, for example, four sides that are parallel to the side faces of the waveguides 2. The waveguides 2a and 2b, which is a pair of waveguides 2, are connected to each other such that, for example, the flanges 20 at the respective ends oppose each other. When the two waveguides 2a and 2b are to be connected to each other, the respective flanges 20 thereof are positioned so as to oppose each other such that the pair of waveguides 2 are in communication with each other. The flanges 20a and 20b each have an opposing face 210. The opposing faces 210 oppose each other when the flanges 20 are to be connected to each other. The opposing faces 210 are located at the leading ends of the waveguides 2, for example. When two waveguides 2 are to be connected to each other, a seal member (not shown) such as a gasket for preventing microwaves from leaking may or may not be positioned between the flanges 20. Alternatively, a seal member (not shown) such as a gasket for keeping the waveguides 2 airtight, for example, may be positioned. For example, when the flanges 20 are positioned so as to oppose each other such that the pair of waveguides 2 are in communication with each other so as to be connected to each other, the opposing faces 210 may or may not abut against each other. For example, when a seal member is positioned between the flanges 20, each opposing face 210 abuts against the seal member, and the opposing faces 210 do not abut against each other. Also, for example, when a seal member is not positioned, the opposing faces 210 abut against each other. For example, when the waveguides 2a and 2b are to be connected to each other, a seal member may be positioned between the opposing face 210 of the flange 20a and the opposing face 210 of the flange 20b. Note that a seal member may be provided on the opposing faces 210 of the flanges 20 in advance.

The waveguide connecting apparatus 1000 includes two waveguide connecting clamps (hereinafter referred to as connecting clamps) 1a and 1b. In the following, for the sake of description, the connecting clamps 1a and 1b may be referred to as connecting clamps 1 when they need not be distinguished from each other (e.g. when they are collectively described).

To connect the waveguides 2 to each other, the connecting clamp 1a includes a first clamp piece $11a_1$ and a second clamp piece $11a_2$ that are positioned so as to oppose each other to sandwich therebetween the outer peripheral portions 201 of the flanges 20a and 20b that are positioned so as to oppose each other such that the waveguides 2 are in communication with each other, and a fastening unit 12a that presses the first clamp piece $11a_1$ and the second clamp piece $11a_2$ against the outer peripheral portions 201 of the flanges 20 that oppose each other. The first clamp piece $11a_1$ and the second clamp piece $11a_2$ may be regarded as a pair of clamp pieces included in the connecting clamp 1a. The first clamp piece $11a_1$ and the second clamp piece $11a_2$ have similar structures.

For the sake of description, the first clamp piece $11a_1$ and the second clamp piece $11a_2$ included in the connecting clamp 1a may simply be referred to as clamp pieces 11a when they need not be distinguished from each other. In addition, for example, the first clamp piece $11a_1$ and the second clamp piece $11a_2$ included in the connecting clamp 1a may also be referred to as a pair of clamp pieces 11a. The same applies to a first clamp piece $11b_1$ and a second clamp piece $11b_2$ that are included in a connecting clamp 1b, which will be described later. Also, when the clamp pieces 11a and clamp pieces 11b need not be distinguished from each other, they may simply be referred to as clamp pieces 11.

Positioning the pair of clamp pieces 11a so as to oppose each other to sandwich the outer peripheral portions 201 of the flanges 20 between them means that the pair of clamp pieces 11a oppose each other in a direction that is parallel to the opposing faces 210 of the flanges 20, and the flanges 20 that are positioned so as to oppose each other such that the waveguides 2 are in communication with each other are located between the clamp pieces 11a. For example, the pair of clamp pieces 11a included in the connecting clamp 1a are positioned so as to oppose each other to sandwich two parallel sides of the outer peripheral portion 201 of each of two substantially rectangular flanges 20 that are positioned so as to oppose each other to be connected to each other.

The connecting clamp 1b has a configuration similar to that of the connecting clamp 1a. The connecting clamp 1b includes a first clamp pieces $11b_1$ and a second clamp pieces $11b_2$, which are similar to the pair of clamp pieces 11a, and a fastening unit 12b, which is similar to the fastening unit 12a. The pair of clamp pieces 11b included in the connecting clamp 1b are positioned so as to oppose each other to sandwich two parallel sides of the outer peripheral portion 201 of each of two substantially rectangular flanges 20 that are positioned so as to oppose each other and to be connected to each other such that the waveguides are in communication with each other, the two parallel sides being orthogonal to the two parallel sides sandwiched by the above-described pair of clamp pieces 11a.

For the sake of description, clamp pieces 11a included in the connecting clamp 1a and the clamp pieces 11b included in the connecting clamp 1*b* may simply be referred to as clamp pieces 11 when they need not be distinguished from each other. Also, the fastening unit 12*a* included in the connecting clamp 1*a* and the fastening unit 12*b* included in the connecting clamp 1*b* may simply be referred to as fastening units 12 when they need not be distinguished from each other.

The connecting clamps 1*a* and 1*b* are, for example, positioned such that the direction in which the pair of clamp pieces 11*a* included in the connecting clamp 1*a* oppose each other and the direction in which the pair of clamp pieces 11*b* included in the connecting clamp 1*b* oppose each other intersect each other. The example here shows a case where the connecting clamps 1*a* and 1*b* are positioned such that the direction in which the pair of clamp pieces 11*a* included in the connecting clamp 1*a* oppose each other and the direction in which the pair of clamp pieces 11*b* included in the connecting clamp 1*b* oppose each other are orthogonal to each other. Preferably, the two connecting clamps 1*a* and 1*b* are positioned such that the direction in which the pair of clamp pieces 11*a* included in the connecting clamp 1*a* oppose each other and the direction in which the pair of clamp pieces 11*b* included in the connecting clamp 1*b* oppose each other are substantially orthogonal to each other. Positioning the pair of clamp pieces 11*a* so as to oppose each other means, for example, placing them such that the respective opposing faces of the two clamp pieces $11a_1$ and $11a_2$ that constitute the pair of clamp pieces 11*a* (e.g. second faces 1112 of abutting members 111 (described later) that are respectively included in the first clamp piece $11a_1$ and the second clamp piece $11a_2$) are parallel to each other. The direction in which the pair of clamp pieces 11*a* oppose each other is, for example, a direction in which a straight line that is orthogonal to the respective opposing faces of the first clamp piece $11a_1$ and the second clamp piece $11a_2$ that constitute the pair of clamp pieces 11*a* extends. The same applies to the pair of clamp pieces 11*b*.

The clamp pieces 11*a* each include two abutting members 111*a* and 111*b*, and a pressing member 112. The same applies to the clamp pieces 11*b*. For the sake of description, the abutting members 111*a* and 111*b* may simply be referred to as abutting members 111 when they need not be distinguished from each other. Two abutting members 111*a* and 111*b* included in one clamp piece 11 may be regarded as a pair of abutting members 111. The clamp pieces 11 are typically made of metal. However, at least a portion of the clamp pieces 11 may be made of a material other than metal as appropriate.

To connect the waveguides 2*a* and 2*b* to each other as described above, each pair of abutting members 111 are positioned so as to sandwich the flanges 2*a* and 2*b* that are positioned so as to oppose each other such that the waveguides 20*a* and 20*b* are in communication with each other, from the faces on the opposite side of the opposing faces, i.e. from the faces on the opposite side of the opposing faces 210 of the flanges 20*a* and 20*b*. For example, the abutting member 111*a* of one clamp piece 11 is positioned on the opposite side of the opposing face 210 of the flange 20*a* of the waveguide 2*a* that is to be connected, and the abutting member 111*b* of one clamp piece 11 is positioned on the opposite side of the opposing face 210 of the flange 20*b* of the waveguide 2*b* that is to be connected.

The abutting members 111 each have a first face 1111 that abuts against the face that is on the opposite side of the opposing face 210, where the flanges 20 oppose each other, of one of two flanges 20 that are positioned such that the waveguides are in communication with each other, a second face 1112 that abuts against a side face of the waveguide 2 that has the flange 20, and a third face 1113 that serves as a tapered face of the flange 20, on the opposite side of the opposing face 210. For example, the abutting member 111*a* has a first face 1111 that abuts against the face that is on the opposite side of the opposing face 210 of the flange 20*a*, a second face 1112 that abuts against a side face of the waveguide 2*a* that has the flange 20*a*, and a third face 1113 that serves as a tapered face of the flange 20*a*, on the opposite side of the opposing face 210. Also, for example, the abutting member 111*b* has a first face 1111 that abuts against the face that is on the opposite side of the opposing face 210 of the flange 20*b*, a second face 1112 that abuts against a side face of the waveguide 2*b* that has the flange 20*b*, and a third face 1113 that serves as a tapered face of the flange 20*b*, on the opposite side of the opposing face 210.

Typically, the angle formed by a side face of a waveguide 2 and the face that is on the opposite side of the opposing face, where the flanges 20 oppose each other, of the flange 20 of the waveguide 2 is 90°. Therefore, it is preferable that the angle formed by the first face 1111 and the second face 1112 of one abutting member 111 is 90°, for example. However, the corner where the first face 1111 and the second face 1112 actually intersect each other may be rounded or chamfered. The third face 1113 is a face that serves as a tapered face of a flange 20 when the first face 1111 is positioned so as to abut against the face that is on the opposite side of the opposing face where the flanges 20 oppose each other, and the second face 1112 is positioned so as to abut against a side face of the waveguide 2 that has the flange 20, for example. The tapered face of a flange 20 is, for example, a face that extends outward of the waveguide 2 in a direction toward the leading end of the waveguide 2. The fact that a face serves as a tapered face of a flange 20 may mean that the face is equivalent to a tapered face of the flange 20, the face appears to be a tapered face of the flange 20, or the face functions as a tapered face of the flange 20, for example. The third face 1113 may be regarded as a face that is inclined relative to the first face 1111 such that the distance from the first face 1111 increases in a direction toward the waveguide 2. Preferably, the angle formed by the first face 1111 and the third face 1113 of an abutting member 111 in a cross section that is orthogonal to the first face 1111 and the second face 1112 is constant regardless of where the cross section is taken, for example. However, a portion that has a different angle may be included. The angle formed by the first face 1111 and the third face 1113*s* is preferably no greater than 45°, more preferably no greater than 40°, and even more preferably no greater than 30°, for example. The third face 1113 is a face to which the corner formed by the first face 1111 and the second face 1112 opposes, for example. The corner where the first face 1111 and the third face 1113 intersect each other and the corner where the second face 1112 and the third face 1113 intersect each other may be rounded or chamfered. There are no restrictions on the length of each abutting member 111 in a direction that is parallel to the first face 1111 and the second face 1112 (hereinafter referred to as the width of the abutting members 111). Here, the width of an abutting member 111 is preferably no greater than the width of the side face of the waveguide 2 against which the second face 1112 of the abutting member 111 abuts. However, if the width is small, the force with which the flanges 20 are sandwiched may be weak, and the force with which the flanges 20 are sandwiched may vary for different positions. Therefore, it is preferable that the width of the abutting members 111 is as large as possible. Typically, the width and so on of rectangular waveguides for microwaves conforms to standards. Therefore, it is preferable that the width of the abutting members 111 is determined according to the width of the waveguides 2 that are to be connected to each other.

The abutting members 111*a* and 111*b*, which are two abutting members 111 that constitute a pair of abutting members 111, are positioned such that the first faces 1111 oppose each other, and the second faces 1112 are parallel to each other, preferably on the same plane, for example. The first face 1111, the second face 1112, and the third face 1113 are flat faces, for example. However, embossing may be performed on the surfaces thereof, protrusions and depressions may be provided on the surfaces thereof, or grooves may be provided in the surfaces thereof. Note that the first face 1111, the second face 1112, and the third face 1113 have a shape that can apply a substantially uniform force to the faces against which they abut. For example, even if a plurality of depressions and protrusions are provided on these faces, it is preferable that a plurality of highest portions of the faces constitute the same plane.

If a tapered face, a curved face, a step, or the like (not shown) is provided in the vicinity of a position where a side face of a waveguide 2 and the face of a flange 20 against which the first face 1111 abuts intersect with each other, the tapered face or the curved face may be regarded as a portion of the side face of the waveguide 2. In this case, the fact that the second face 1112 of the abutting member 111 abuts against a portion of the tapered face, the curved face, the step, or the like may be regarded as the same as the fact that the second face 1112 abuts against the side face of the waveguide 2.

Note that if a cross section that is orthogonal to the second face 1112, of an abutting member 111 is substantially triangular, the length of the first face 1111 in a direction that is orthogonal to the second face 1112 is preferably no less than the distance between the end of the flange 20 and the side face of the waveguide 2. If the cross section is not substantially triangular (e.g. if the cross section has a rectangular shape or the like formed by cutting off a portion where the first face 1111 and the third face 1113 intersect each other), the length between the position where a plane that includes the first face 1111 and a plane that includes the third face 1113 intersect each other and the position where the second face 1112 and the first face 1111 intersect each other is preferably no less than the distance from the outer peripheral portion 201 of the flange 20 to the side face of the waveguide 2.

In the present embodiment, the third faces 1113 of the abutting members 111 are made of polytetrafluoroethylene. The fact that the third faces 1113 are made of polytetrafluoroethylene may mean that the third faces 1113 are coated with polytetrafluoroethylene, or a sheet, a plate, or the like that is made of polytetrafluoroethylene is positioned or embedded in portions that serve as the third faces 1113. With such a configuration, it is possible to reduce friction when the abutting members 111 with the engaging third faces 1113 are moved, and it is possible to press the pressing members 112 without loss of energy. However, the third faces 1113 may not be made of polytetrafluoroethylene.

The pressing member 112 of one clamp piece 11 has two inclined faces 1121*a* and 1121*b* that engage with the pair of abutting members 111 of the same clamp piece 11, and has a substantially V-shaped cross section. The cross section mentioned here is, for example, a cross section that is orthogonal to the widthwise direction of the abutting members 111 of the same clamp pieces 11. The two inclined faces 1121*a* and 1121*b* of the pressing member 112 of one clamp piece 11 are, for example, inclined faces that engage with at least the third faces 1113 of the pair of abutting members 111 of the same clamp piece 11, which is positioned such that the third faces 1113 serve as tapered faces of the flanges 20. The present embodiment describes an example in which the third face 1113 of the abutting member 111*a* of the pair of abutting members 111 of one clamp piece 11 engages with the inclined face 1121*a* of the pressing member 112 of the clamp piece 11, and the third face 1113 of the abutting member 111*b* of the pair of abutting member 111 engages with the inclined face 1121*b* of the pressing member 112 of the clamp piece 11. For the sake of description, the inclined faces 1121*a* and 1121*b* may simply be referred to as inclined faces 1121 when they need not be distinguished from each other.

For example, the two inclined faces 1121 of the pressing member 112 oppose each other. The two inclined faces 1121 are provided so as to extend toward the flanges 20, for example. For example, the two inclined faces 1121 are provided so as to extend inward relative to a frame 121, which will be described later. The pressing member 112 may be regarded as having a groove that is formed by two inclined faces 1121. This groove is, for example, a groove that extends in the widthwise direction of the abutting members 111, of the pressing member 112. The fact that the pressing member 112 has a substantially V-shaped cross section may mean that a portion corresponding to the two inclined faces 1121 in a cross section is substantially V-shaped. For example, the pressing member 112 may be regarded as having a substantially V-shaped groove that is formed by two inclined faces 1121.

The pair of abutting members 111 are held by the pressing member 112 so as to be moveable in the direction of inclination of the inclined faces 1121 with which the pair of abutting members 111 respectively engage. Specifically, an abutting member 11*a* is held on the side of the inclined face 1121*a* of the pressing member 112 of one clamp piece 11 so as to be moveable in the direction of inclination of the inclined face 1121*a*, and an abutting member 111*b* is held on the side of the inclined face 1121*b* of the pressing member 112 of the same clamp piece 11 so as to be moveable in the direction of inclination of the inclined face 1121*b*. There are no restrictions on how the abutting members 111 are held by the pressing member 112 so as to be moveable in the direction of inclination of the inclined faces 1121 with which the abutting members 111 respectively engage. The pressing member 112 holds the abutting members 111 such that the abutting members 111 do not become detached from the pressing member 112 even when the abutting members 111 do not abut against waveguides. There are no restrictions on what configuration is employed to allow the abutting members 111 to be held by the pressing member 112 so as to be moveable in the direction of inclination of the inclined faces 1121.

The present embodiment describes an example in which a holding structure that includes two penetrating grooves 114 that are provided in each inclined face 1121 of the pressing member 112 and two rod-shaped members 115 that each have an anti-fall structure 115*a* is employed so that the abutting members 111 are held by the pressing member 112 so as to be moveable in the direction of inclination of the inclined faces 1121. The following describes an example of this holding structure with reference to FIG. 2.

The inclined faces 1121*a* and 1121*b* of the pressing member 112 each have two penetrating grooves 114 that extend in the direction of inclination of the inclined face 1121*a* or 1121*b*. The third face 1113 of the abutting member 111*a* held by the pressing member 112 is provided with two rod-shaped members 115 that respectively penetrate through the two penetrating grooves 114 in the inclined face 1121*a* that engages with the third face 1113. Similarly, the third face 1113 of the abutting member 111*b* held by the pressing member 112 is provided with two rod-shaped members 115 that respectively penetrate through the two penetrating grooves 114 in the inclined face 1121*b* that engages with the third face 1113. The rod-shaped members 115 are provided so as to be substantially orthogonal to the third face 1113, for example. However, the rod-shaped members 115 may be provided so as not to be substantially orthogonal to the third face 1113. Each rod-shaped member 115 is provided with an anti-fall structure 115*a* on the opposite side to the abutting members 111, which prevents the rod-shaped member 115 from falling off the penetrating groove 114. The anti-fall structure 115*a* mentioned here is a thick portion of the rod-shaped member 115 thicker than the width of the penetrating groove 114.

Along the two penetrating grooves 114 in one inclined face 1121*a* of one pressing member 112, the two rod-shaped members 115 provided on the abutting member 111*a* that has the third face 1113 that engages with the inclined face 1121*a* are moveable. Thus, the abutting member 111*a* is moveable in the direction of inclination of one inclined face 1121*a* that engages with the third face 1113 of the abutting member 111*a*, of the pressing member 112. Since the anti-fall structures 115*a* cannot pass through the penetrating grooves 114, the abutting member 111*a* can be held so as not to become detached from the pressing member 112. The same applies to the inclined face 1121*b* and the abutting member 111*b*.

In this way, due to the penetrating grooves 114 and the rod-shaped members 115 that each have an anti-fall structure 115*a*, the abutting members 111 of the clamp pieces 11 can be held by the pressing member 112 so as to be movable.

Note that there are no restrictions on where the penetrating grooves 114 are provided. For example, the penetrating grooves 114 are provided at the same distance from the ends of each abutting member 111 in the widthwise direction.

Also, the length of the penetrating grooves 114 in the direction of inclination is preferably such that, for example, when the rod-shaped members 115 are moved in the direction in which the two inclined faces 1121 of the penetrating grooves 114 become closer to each other, the distance between the first faces 1111 of the two abutting members 111 becomes smaller than the thickness of the two flanges 20 that oppose each other.

In order to increase the moving distance of the abutting members 111, the rod-shaped members 115 are preferably provided in the third face 1113, at positions that are distant from the second face 1112, for example.

There are no restrictions on the cross-sectional shape and so on of the rod-shaped members 115. For example, a circular shape or a polygonal shape such as a rectangular shape may be employed. For example, a rod-shaped member that has, in a cross section, a longer length in the lengthwise direction of the penetrating grooves 114 than in the direction that is orthogonal to the lengthwise direction may be used as a rod-shaped member 115. In a case where such a rod-shaped member 115 is used, even if only one penetrating groove 114 is provided in each inclined face 1121, for example, the abutting member 111 is prevented from pivoting about the rod-shaped member 115.

Also, the thick portion of each rod-shaped member 115, which is the above-described anti-fall structure 115*a*, may be a portion formed by squashing the rod-shaped member 115 at a position that is opposite to the abutting member 111, or a ring that is fitted onto the attached rod-shaped member 115 through welding or bonding, a member that sandwiches the rod-shaped member 115, or the like. Note that each anti-fall structure 115*a* may be, for example, a pin that is inserted into a hole (not shown) that is provided at a position that is opposite to the abutting member 111 of the rod-shaped member 115 corresponding thereto, so as to be orthogonal to the direction in which rod-shaped member 115 extends.

Also, the distance between the anti-fall structure 115*a* and the third face 1113 of the abutting member 111 is preferably a distance at which they are prevented from sandwiching a portion around the penetrating groove 114 so as not to block the rod-shaped member 115 from moving, e.g. a distance that is longer than the length of the penetrating groove 114 in the depthwise direction. However, if the distance is too long, the abutting member 111 greatly moves in, for example, a direction that is orthogonal to the inclined face 1121, and impairs operability. Therefore, it is preferable that the length is adjusted as appropriate.

Also, although a case where two penetrating grooves 114 are proved in each inclined face 1121 is described above, the number of penetrating groove(s) 114 may be one or three or more.

Also, each rod-shaped member 115 that has an anti-fall structure 115*a* may be a screw (not shown), a pin, or the like whose head has a width that is larger than the width of the penetrating groove 114. For example, each rod-shaped member 115 may be attached to the third face 1113 of an abutting member 111 by inserting such a screw or a pin into a hole such as a screw hole (not shown) provided in the third face 1113 of the abutting member 111. In this case, a head of the screw serves as the anti-fall structure 115*a*.

It is preferable that the length of the pressing member 112 in the widthwise direction is the same as the length, in the widthwise direction, of the two abutting members 111 held by the pressing member 112. The width of the pressing member 112 is, for example, a length in a direction that is parallel to the widthwise direction of the abutting members 111 that are held by the pressing member 112. The present embodiment describes an example in which the length of the pressing member 112 in the widthwise direction is the same as the length of the abutting members 111 in the widthwise direction. However, the lengths are not necessarily the same, and there are no restrictions on the lengths.

A pair of clamp pieces 11*a* of the connecting clamp 1*a*, i.e. the first clamp piece $11a_1$ and the second clamp piece $11a_2$ are positioned such that the two inclined faces 1121*a* and 1121*b* of the pressing member 112 of one clamp piece oppose those of the other clam piece, for example. For example, the pair of clamp pieces 11*a* are positioned such that the two inclined faces 1121*a* and 1121*b* of one of the pair of clamp pieces 11*a* oppose those of the other clamp piece, with the outer peripheral portions 201 of the flanges 20*a* and 20*b* being sandwiched therebetween, the flanges 20*a* and 20*b* being positioned such that the waveguides 2*a* and 2*b* are in communication with each other so as to be connected to each other. The fact that the first clamp piece $11a_1$ and the second clamp piece $11a_2$ are positioned such that the two inclined faces 1121*a* and 1121*b* of the pressing member 112 of one of the pair of clamp pieces 11*a* oppose those of the other clamp piece may be regarded as the fact that the first clamp piece $11a_1$ and the second clamp piece $11a_2$ are positioned such that grooves that each have two inclined faces 1121*a* and 1121*b* and are provided in the pressing members 112 of the first clamp piece $11a_1$ and the second clamp piece $11a_2$ oppose each other, for example.

The same applies to the pair of clamp pieces $11b$ of the connecting clamp $1b$, i.e. the fist clamp piece $11b_1$ and the second clamp piece $11b_2$.

The frame 121 is a frame-shaped member that is positioned so as to surround the flanges $20a$ and $20b$ that oppose each other. The frame 121 is a frame body that has an opening portion $121a$ of a size that allows the waveguides 2 and the flanges 20 thereof to pass therethrough. The frame 121 is a member for directly or indirectly holding the clamp pieces 11, for example. The frame 121 may hold one or more clamp pieces 11 so as to be movable. The frame 121 may be regarded as constituting a portion of each of the connecting clamp $1a$ and the connecting clamp $1b$. For example, the frame 121 may be regarded as being shared by the connecting clamp $1a$ and the connecting clamp $1b$ as their constituent element. For example, the connecting clamp $1a$ may be regarded as including the pair of clamp pieces $11a$, the fastening unit $12a$ (described below) that presses the clamp pieces $11a$, and the frame 121, and the connecting clamp $1b$ may be regarded as including the pair of clamp pieces $11b$, the fastening unit $12b$ (described below) that presses the clamp pieces $11b$, and the frame 121.

The frame 121 may be a frame that has a removable configuration in which a portion of a side or the like is removable, or an openable/closable configuration in which a portion of a side or the like can be opened or closed. The frame 121 may also be a frame that does not have a removable configuration or an openable/closable configuration. Hereinafter, a frame that does not have a removable configuration or an openable/closable configuration is referred to as a closed frame. For example, by using a closed frame as the frame 121, it is possible to prevent the frame 121, through which the waveguides 2 or the like have been passed, from becoming detached from the waveguides 2 and falling out due to an error during work. Also, by employing a frame 121 with the removable configuration or openable/closeable configuration, it is possible to place two flanges 20 within the opening portion $121a$ of the frame 121 so as to oppose each other such that the waveguides 2 are in communication with each other, without detaching the two flanges 20 positioned so as to oppose each other such that the waveguides 2 are in communication with each other, which further improves workability. The present embodiment describes an example in which the frame 121 is rectangular in plan view and does not have a removable configuration or an openable/closable configuration. However, there are no restrictions on the shape of the frame 121 in plan view, for example.

The fastening unit $12a$ of the connecting clamp $1a$ is a unit that presses the pair of clamp pieces $11a$ that are positioned so as to oppose each other and sandwich the outer peripheral portions 201 of the flanges $20a$ and $20b$ that oppose each other, against the outer peripheral portions 201 of the flanges $20a$ and $20b$. Pressing the pair of clamp pieces $11a$ means achieving the result that the pair of clamp pieces $11a$ are pressed against the outer peripheral portions 201, and may mean that one of the pair of clamp pieces $11a$ is fixed and the other is pressed against the outer peripheral portions 201. It may mean that both clamp pieces $11a$ are pressed from both sides of the outer peripheral portions 201. The same applies to the fastening unit $12b$ of the connecting clamp $1b$, except that the connecting clamp $1b$ presses the pair of clamp pieces $11b$.

There is no restrictions on the configurations of the fastening unit $12a$ and $12b$. The present embodiment describes an example in which the fastening unit $12a$ of the connecting clamp $1a$ has a screw 122 that pushes out the second clamp piece $11a_2$, which is one of the pair of clamp pieces $11a$, via the frame 121, and the fastening unit $12b$ of the connecting clamp $1b$ has a screw 122 that pushes out the clamp piece $11b_2$, which is one of the pair of clamp pieces $11b$, via the frame 121. The following describes the fastening unit $12a$ as an example of the fastening units 12. Although a detailed description is omitted, it is envisaged here that the fastening unit $12b$ of the connecting clamp $1b$ has a similar configuration.

As shown in FIGS. 1A and 1B, the first clamp piece $11a_1$ of the connecting clamp $1a$ is fixed at one side of the frame 121 such that the inclined faces $1121a$ and $1121b$ of the pressing member 112 face inward relative to the frame 121. The first clamp piece $11a_1$ may be fixed through bonding or fusing, or by using a screw, and there are no restrictions on how to fix. Also, the side that opposes the side at which the first clamp piece $11a_1$ is fixed is provided with the screw 122 that pushes out the second clamp piece $11a_2$, passing through the frame 121. For example, the screw 122 is fitted into a screw hole 1211, which is provided penetrating through a side portion of a side of the frame 121, and into which the screw 122 can be screwed, such that the leading end of the screw protrudes inward of the frame 121, and the second clamp piece $11a_2$ is attached to the leading end of the screw 122 such that the inclined faces 1121 of the pressing member 112 faces inward of the frame 121. The second clamp piece $11a_2$ is attached to the leading end of the screw 122 so as to be rotatable about the shaft of the screw 122 and so as to be able to receive a force that acts in the direction in which the shaft of the screw 122 extends. The second clamp piece $11a_2$ may be directly attached to the leading end of the screw 122, or indirectly attached to the leading end via one or more members or the like. The present embodiment describes an example in which a thrust plate 1221 is attached to the leading end of the screw 122 so as to be rotatable relative to the screw 122, and since the thrust plate 1221 is attached to the second clamp piece $11a_2$ of the thrust plate 1221 at a position on the opposite side to the abutting members 111, the second clamp piece $11a_2$ is held so as to be rotatable relative to the screw 122. The thrust plate 1221 may be embedded in the leading end portion of the screw 122, or attached to the leading edge of the screw 122, using another screw or the like, or bonded or fused thereto. Also, the thrust plate 1221 may be attached so as to be swingable via a ball joint (not shown) or the like. However, there are no restrictions on what configuration is employed to connect the screw 122 and the second clamp piece $11a_2$, provided that the second clamp piece $11a_2$ can be rotatably held. For example, a thrust bearing (not shown) that has a bearing, a swivel nut (not shown), or the like may be used instead of the thrust plate 1221 to attach the second clamp piece $11a_2$ to the leading end of the screw 122. Such a structure that connects the screw 122 and the clamp piece 11 is well-known as a structure for a so-called screw clamp or the like, and therefore a detailed description is omitted here.

A handle 1222 for rotating the screw 122 is provided on the screw 122 outside the frame 121. The screw 122 may be provided with a head that is similar to the head of a typical screw, instead of the handle 1222. Here, a rod with thread grooves or the like may also be regarded as one aspect of a screw.

By rotating the handle 1222 by hand to rotate the screw 122, the second clamp piece $11a_2$ attached to the screw end of the screw 122 can be pushed out, and the pair consisting of the second clamp piece $11a_2$ thus pushed out and the first clamp piece $11a_1$ attached to the frame 121 so as to oppose the second clamp piece $11a_2$ can be pressed against the outer peripheral portions 201 of the flanges 20a and 20b that are positioned between them so as to oppose each other such that the waveguides 2a and 2b are in communication with each other. Also, the second clamp piece $11a_2$ attached to the screw 122 is rotatable relative to the screw 122, and therefore, when the screw 122 is rotated and pushed out of the screw hole 1211, the second clamp piece $11a_2$ can be pushed out such that the second clamp piece $11a_2$ does not rotate along with the rotation of the screw 122.

The above description describes a case where the fastening unit 12a of one connecting clamp 1 has a screw 122 that pushes out the second clamp piece $11a_2$, which is one of the pair of clamp pieces 11a of the one connecting clamp 1. However, the fastening unit 12a of one connecting clamp 1 need only have, for example, a screw 122 that pushes out at least one of the pair of clamp pieces 11a of the one connecting clamp 1, and may have two screws 122 that push out both the first clamp piece $11a_1$ and the second clamp piece $11a_2$, respectively. For example, screw holes 1211 may be respectively provided in the sides that oppose each other of the frame 121 as described above, screws 122 may be inserted into the screw holes 1211 as described above, and the first clamp piece $11a_1$ and the second clamp piece $11a_2$, which are a pair of clamp pieces, may be respectively attached to the leading ends of the screws 122. The same applies to the fastening unit 12b and the pair of clamp pieces 11b.

The direction in which the fastening unit 12a of the connecting clamp 1a presses the pair of clamp pieces 11a and the direction in which the fastening unit 12b of the connecting clamp 1b presses the pair of clamp pieces 11b are, for example, directions that intersect each other, and preferably, directions that are substantially orthogonal to each other. "Substantially orthogonal" means, for example, the range of 80° to 100°, and preferably the range of 85° to 95°.

Note that the frame 121 may or may not be regard as part of the fastening units 12. When the frame 121 is regarded as part of the fastening units 12, the fastening units 12a and 12b of the connecting clamps 1a and 1b may be regarded as sharing one frame 121 as a constituent element.

The following describes an example of a method for connecting the waveguides 2a and 2b to each other, using the waveguide connecting apparatus 1000.

First, one of the waveguides 2a and 2b is passed through the opening portion 121a of the frame 121 of the waveguide connecting apparatus 1000, and thereafter, as shown in FIG. 3A, the opposing faces 210 of the flanges 20a and 20b are positioned so as to oppose each other such that the waveguides 2a and 2b, which are rectangular waveguides, are in communication with each other. In a case where a seal member (not shown) is used to connect the flanges 20 to each other, the opposing face 210 of the flange 20a and the opposing face 210 of the flange 20b each abut against the seal member positioned between the opposing faces 210, for example. In a case where a seal member is not used, the opposing face 210 of the flange 20a and the opposing face 210 of the flange 20b abut against each other, for example. Then, the frame 121 is moved to a position near the outer peripheral portions 201 of the flanges 20a and 20b, and a portion around first sides 2011, which is composed of one of the four sides of the flange 20a and one of the four sides of the flange 20b positioned so as to oppose each other, are sandwiched between the first faces 1111 of the abutting members 111a and 111b of the first clamp piece $11a_1$ included in the connecting clamp 1a. Note that the first sides 2011 mentioned here are sides on the same side, of the flanges 20a and 20b. The same applies to second sides 2012, third sides 2013, and fourth sides 2014, which will be described later.

Similarly, a portion around the second sides 2012 of the flanges 20a and 20b positioned so as to oppose each other is sandwiched between the first faces 1111 of the abutting members 111a and 111b of the first clamp piece $11b_1$ included in the connecting clamp 1b. The second sides 2012 are sides that are orthogonal to the first sides 2011.

Next, by operating the handle 1222 of the fastening unit 12a, the screw 122 of the fastening unit 12a is rotated so as to be sent toward the center of the frame 121, and thus the second clamp piece $11a_2$ of the connecting clamp 1a is moved toward the first clamp piece $11a_1$ of the connecting clamp 1a. By moving the second clamp piece $11a_2$, a portion around the third sides 2013 of the flanges 20a and 20b positioned so as to oppose each other as described above is sandwiched between the first faces 1111 of the abutting members 111a and 111b of the second clamp piece $11a_2$. Sandwiching may be supported by a user, using his/her hand or the like. The third sides 2013 are sides that are on the opposite side to the first sides 2011. FIG. 4A is a cross-sectional view showing an area around the clamp piece $11a_2$ in a sandwiching state, i.e. a state in which the abutting members 111 abut against: the faces on the opposite side of the opposing faces where the flanges 20 oppose each other; and side faces of the waveguides 2.

Similarly, by operating the handle 1222 of the fastening unit 12b, the screw 122 of the fastening unit 12b is rotated, and thus the second clamp piece $11b_2$ of the connecting clamp 1b is moved toward the first clamp piece $11b_1$ of the connecting clamp 1b. Thus, a portion around the fourth sides 2014 of the flanges 20a and 20b positioned so as to oppose each other as described above is sandwiched between the first faces 1111 of the abutting members 111a and 111b of the second clamp piece $11b_2$ of the connecting clamp 1b. The fourth sides 2014 are sides that are on the opposite side to the second sides 2012.

Furthermore, the screw 122 of the fastening unit 12a is rotated by operating the handle 1222 of the fastening unit 12a, and accordingly the second clamp piece 11a of the connecting clamp 1a is moved toward the first clamp piece $11a_1$ of the connecting clamp 1a, the inclined faces 1121a and 1121b of the pressing member 112 of the second clamp piece $11a_2$ engage with the third faces 1113 of the abutting members 11a and 11b of the second clamp piece $11a_2$, and the abutting members 111a and 111b of the second clamp piece $11a_2$ are pushed toward the first clamp piece 11a. Thus, the second face 1112 of the abutting member 111a abuts against the first side face 21a of the waveguide 2a, and the second face 1112 of the abutting member 111b abuts against the first side face 21b of the waveguide 2b. Also, the first face 1111 of the abutting member 111a abuts against, and is pressed against, a portion around the third side 2013 of a face of the flange 20a on the opposite side to the face that opposes the flange 20b, and the first face 1111 of the abutting member 111b abuts against, and is pressed against, a portion around the third side 2013 of a face of the flange 20b on the opposite side to the face that opposes the flange 20a. Note that the first side face 21a of the waveguide 2a and the first side face 21b of the waveguide 2b are faces that oppose the second clamp piece $11a_2$.

The screw 122 of the fastening unit 12a is further rotated, and accordingly the abutting members 111a and 111b are pressed in the direction toward the first side face 21a of the waveguide 2a and the first side face 21b of the waveguide 2b, but do not move in this direction because the second face 1112 of the abutting member 111a and the second face 1112 of the abutting member 111b already abut against the first side face 21a of the waveguide 2a and the first side face 21b of the waveguide 2b. The abutting members 111a and 111b are pressed even harder in the direction toward the flange 20a and the flange 20b that are positioned so as to oppose each other as described above, and thus sandwich the flange 20a and the flange 20b with a stronger force. Thus, it is possible to fasten a portion around the third sides 2013 of the flanges 20a and 20b that oppose each other. FIG. 4B is a cross-sectional view of an area around the second clamp piece 11a₂ in a fastened state.

Also, by rotating the screw 122 of the fastening unit 12a as described above, the side of the frame 121 to which the first clamp piece 11a₁ included in the connecting clamp 1a is attached is drawn toward the waveguides 2. Thus, in the same manner as described above, the second faces 1112 of the abutting members 111a and 111b of the first clamp piece 11a₁ included in the connecting clamp 1a abut against the third side faces (not shown) of the waveguides 2a and 2b, which are the side faces on the opposite side to the first side faces 21a and 21b, the first faces 1111 of the abutting members 111a and 111b of the first clamp piece 11a₁ are pressed hard against a portion around the first sides 2011 of the flanges 20a and 20b, and sandwich them with a strong force. Thus, in the same manner as in FIG. 4B, it is possible to fasten a portion around the first sides 2011 of the flanges 20a and 20b opposing each other.

Also, the screw 122 of the fastening unit 12b is further rotated by operating the handle 1222 of the fastening unit 12b, and accordingly, in the same manner as described above, the second faces 1112 of the abutting members 111a and 111b of the second clamp piece 11b₂ abut against the second side faces 22a and 22b of the waveguides 2a and 2b. If the screw 122 is further rotated continuously, the first faces 1111 of the abutting members 111a and 111b of the second clamp piece 11b₂ are pressed against a portion around the fourth sides 2014 of the flanges 20a and 20b positioned so as to oppose each other, and sandwich them with a strong force. Thus, in the same manner as in FIG. 4B, it is possible to fasten a portion around the fourth sides 2014 of the flanges 20a and 20b opposing each other.

Also, by rotating the screw 122 of the fastening unit 12b as described above, the side of the frame 121 to which the first clamp piece 11b₁ included in the connecting clamp 1b is attached is drawn toward the waveguides 2. Thus, in the same manner as described above, the second faces 1112 of the abutting members 111a and 111b of the first clamp piece 11b₁ included in the connecting clamp 1b abut against the fourth side faces (not shown) of the waveguides 2a and 2b, which are the side faces on the opposite side to the second side faces 22a and 22b, the first faces 1111 of the abutting members 111a and 111b of the first clamp piece 11b₁ are pressed hard against a portion around the second sides 2012 of the flanges 20a and 20b, and sandwich them with a strong force. Thus, in the same manner as in FIG. 4B, it is possible to fasten a portion around the second sides 2012 of the flanges 20a and 20b opposing each other.

In this way, by pressing the pressing members 112 of the connecting clamps 1a and 1b, it is possible to connect the waveguides 2a and 2b at their respective flanges 20 as shown in FIG. 3B, using the waveguide connecting apparatus 1000.

As described above, according to the present embodiment, it is possible to easily improve workability when connecting waveguides to each other. For example, according to the present embodiment, the anti-fall structures 115a are provided on the rod-shaped members 115 that penetrate through the penetrating grooves 114 provided in the inclined faces 1121 of the pressing members 112, and therefore the abutting members 111 can be held in the vicinity of the inclined faces 1121 of the pressing members 112 so as to be movable. Therefore, it is possible to place the abutting members 111 on the faces on the opposite side of the opposing faces where the flanges 20 oppose each other, to fasten the connecting portions of the waveguides 2, without separately placing the abutting members 111 on the flanges 20. Thus, it is possible to improve workability.

Also, for example, the waveguide connecting apparatus 1000 can be used to connect common waveguides 2 that include flanges 20 that are not provided with tapered faces or the like. Therefore, there is no need to prepare special waveguides 2 or the like, and it is possible to easily improve workability when connecting waveguides 2 to each other.

Also, the rod-shaped members 115 penetrating through the penetrating grooves 114 provided in the inclined faces 1121 of the pressing members 112 are provided on the third faces 1113 of the abutting members 111, and therefore, it is possible to limit the directions in which the abutting members 111 move when the pressing members 112 are pushed out and the abutting members 111 engaging with the inclined faces 1121 thereof are pushed out, to the directions of inclination of the inclined faces. Thus, it is possible to save the user from having to adjust the directions in which the abutting members 111 are moved, for example, and improve workability.

Although the above embodiment describes an example in which the third faces 1113 of the abutting members 111 are made of polytetrafluoroethylene, the present invention allows that at least the third faces 1113 of the abutting members 111 or the inclined faces 1121 of the pressing members 112 engaging with the third faces 1113 are made of polytetrafluoroethylene. For example, the inclined faces 1121 of the pressing members 112 may be made of polytetrafluoroethylene, or both the third faces 1113 of the abutting members 111 and the inclined faces 1121 of the pressing member 112 engaging with the third faces 1113 may be made of polytetrafluoroethylene. With such a configuration, in the same manner as described above, it is possible to reduce friction when the abutting members 111 engaging with the third faces 1113 are moved, and it is possible to press the pressing members 112 without loss of energy. The fact that the third faces 1113 are made of polytetrafluoroethylene may mean that portions of the third faces 1113 are made of polytetrafluoroethylene, or the third faces 1113 are entirely made of polytetrafluoroethylene. The same applies to the inclined faces 1121 of the pressing members 112.

Note that, according to the present invention, it is possible to form at least the third faces 1113 of the abutting members 111 or the inclined faces 1121 of the pressing members 112 engaging with the third faces 1113 may have a shape that causes less friction, or be made of a material with less friction other than polytetrafluoroethylene, provided that friction between the third faces 1113 of the abutting members 111 and the inclined faces 1121 of the pressing members 112 engaging with the third faces 1113 can be reduced.

Modification 1

Figure 5A:
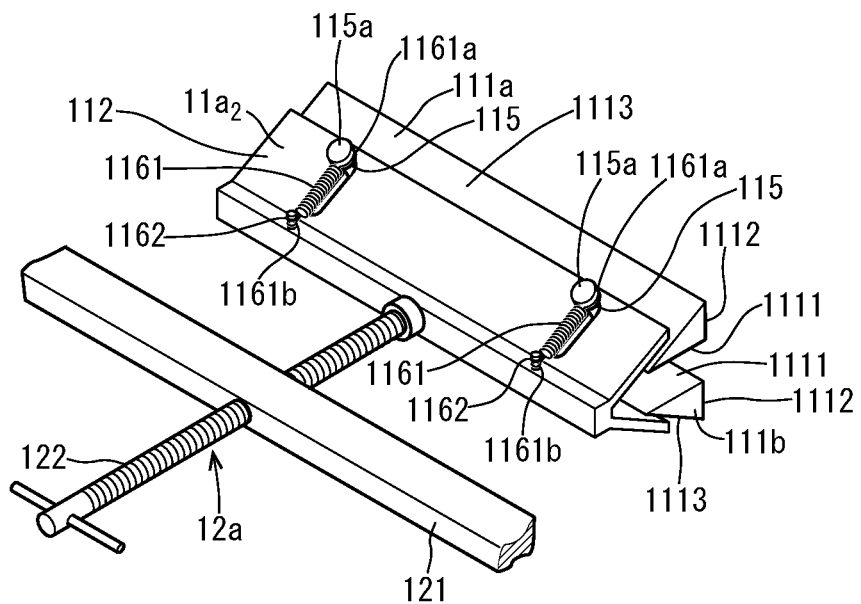
FIGS. 5A and 5B are perspective views of a main part, illustrating a modification of the waveguide connecting apparatus.
Figure 5B:
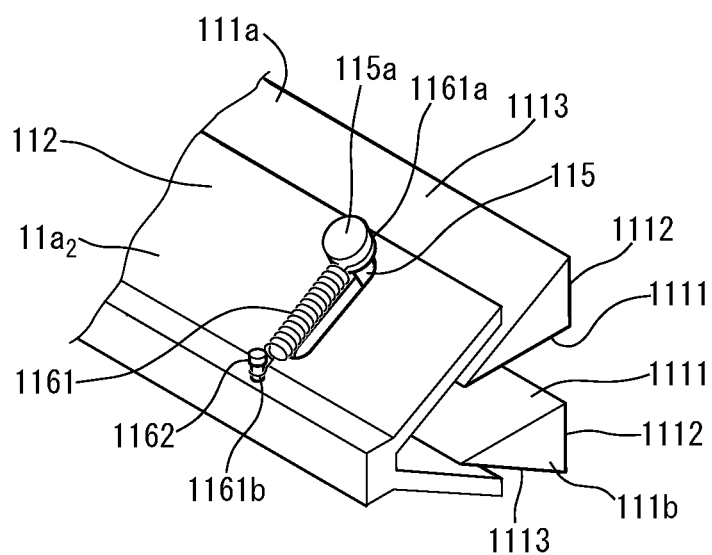

FIGS. 5A and 5B are perspective views of the second clamp piece 11a₂ of the connecting clamp 1a of the waveguide connecting apparatus 1000, illustrating a modification of the embodiment.

According to this modification, the waveguide connecting apparatus 1000 shown in the above-described first embodiment is provided with springs 1161, which are biasing members that bias the rod-shaped members 115 provided on the abutting member 111a of the second clamp piece $11a_2$ included in the connecting clamp 1, outward of the pressing member 112 that holds the abutting member 111a. "Outward of the pressing member 112" means, for example, a direction in which the pressing member 112 faces the waveguides 2. Outward of the pressing member 112 may be regarded as, for example, a protruding direction from the groove that is formed by the two inclined faces 1121 of the pressing member 112 and has a substantially V-shaped cross section. Although not shown in the drawing here, the rod-shaped members 115 provided on the abutting member 111b of the same second clamp piece $11a_2$ are also provided with the springs 1161 that bias the rod-shaped members 115 outward of the pressing member 112. For example, every rod-shaped member 115 is provided with a spring 1161. The respective first ends 1161a of the springs 1161 are attached to the rod-shaped members 115, and the respective second ends 1161b of the springs 1161 are attached to pins 1162 or the like that are provided at positions near the distal ends of the penetrating grooves 114, with respect to the waveguides 2, of the pressing member 112 in which the rod-shaped members 115 are positioned. The springs 1161 are attached so as to be shorter than their natural length. Note that the second ends 1161b may be attached to any position, provided that they are at a distance from the waveguides 2, and there are no restrictions on how the second ends 1161b are fixed to the pressing member 112 and the rod-shaped members 115.

Although the second clamp piece $11a_2$ of the connecting clamp 1 is described here, the above-described configuration can also be applied to the other clamp piece 11.

With such springs 1161, it is possible to keep the two abutting members 111a and 111b at positions near the outer end of the pressing member 112 and keep the gap between the two abutting members 111a and 111b wide until the abutting members 111 abut against the flanges 20 and the waveguides 2. Thus, it is possible to make it easier to sandwich the flanges 20 that oppose each other, and to further improve workability.

Note that the above-described configuration with the springs 1161 is an example, and each clamp piece 11 may be provided with a biasing unit that biases the pair of abutting members 111 outward of the pressing member 112 that holds the abutting members 111, other than the above-described biasing unit provided with the springs 1161. For example, a structure to which a spring (not shown) that biases the abutting members 111 outward of the pressing member 112 is attached may be provided as a biasing unit. Note that, as with the above-described springs 1161, a biasing unit preferably biases the abutting members 111 along the inclined faces 1121 of the pressing member 112 that engages with the abutting members 111, e.g. in a direction that is substantially parallel to the inclined faces 1121.

Modification 2

The above embodiment describes a case where the abutting members 111 are held by a holding structure that is constituted by two penetrating grooves 114 provided in the inclined faces 1121 of the pressing member 112, and two rod-shaped members 115 that each have an anti-fall structure 115a, such that the abutting members 111 can move in the direction of inclination of the inclined faces 1121. However, according to the present invention, any holding structure may be employed, provided that the abutting members 111 can be held by the pressing member 112 so as to be movable in the direction of inclination of the inclined faces 1121.

Figure 6A:
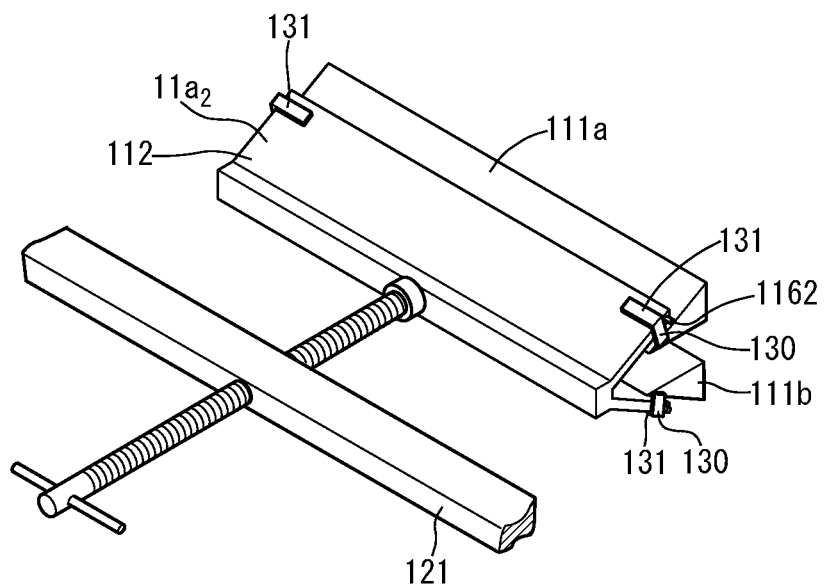
FIG. 6 includes a perspective view (FIG. 6A) of a main part, illustrating a modification of the waveguide connecting apparatus, and a partially-enlarged view (FIG. 6B) thereof.
Figure 6B:
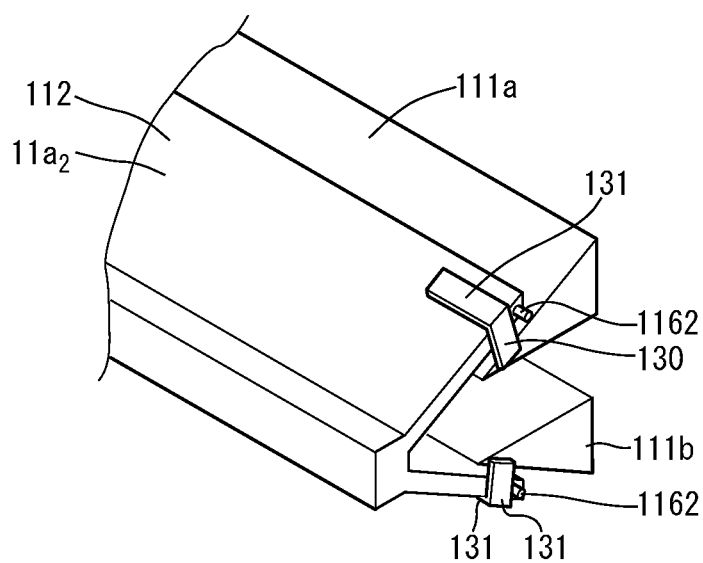

FIG. 6 includes a perspective view (FIG. 6A) of the second clamp piece $11a_2$ of the connecting clamp 1a of the waveguide connecting apparatus 1000, and a partially-enlarged view (FIG. 6B) thereof, illustrating a modification of the embodiment.

The second clamp piece $11a_2$ according to this modification is provided with guide members 130 that respectively include engaging portions 131 at both side faces of the abutting members 111a and 111b, each engaging portion 131 being bent in an L shape so as to extend toward the faces on the opposite side of the inclined faces 1121a and 1121b of the pressing member 112. Also, protrusions such as the pins 1162 are provided on both side faces of the pressing member 112, at positions near the waveguides 2.

This modification has a configuration in which portions that each have a substantially C-shaped cross section, constituted by the guide members 130 on both side faces of the abutting members 111a and 111b and the third faces 1113 of the abutting members 111a and 111b, are fitted to the side faces of the pressing member 112. Therefore, the abutting members 111a and 111b can be held so as to be movable along the inclined surfaces. However, in this case, the distance between the inclined faces 1121 of the pressing member 112 and the faces on the opposite side of the inclined faces 1121 is set to be substantially uniform. Also, due to the protrusions such as the pins 1162 provided on both side faces of the pressing member 112, the guide members 130 is prevented from becoming detached, and thus the abutting members 111a and 111b can be held so as not to become detached from the pressing member 112.

Although the second clamp piece $11a_2$ of the connecting clamp 1a is described here, the above-described configuration can also be applied to the other clamp piece 11. Also, guide rails (not shown) that extend along the inclined faces and rails (not shown) that are fitted to the guide rails and are movable along the guide rails may be provided on both side faces of the pressing member 112 instead of the above-described guide members 130, and both side faces of the abutting members 111 may be connected to the rails using plates (not shown) or the like.

Modification 3

The above embodiment describes a case where the waveguide connecting apparatus 1000 is provided with the fastening units 12 that include the screws 122. However, the present invention may employ fastening units or the like that have any other configuration, provided that they can press pairs of clamp pieces 11 against the outer peripheral portions 201 of the flanges 20.

Figure 7:
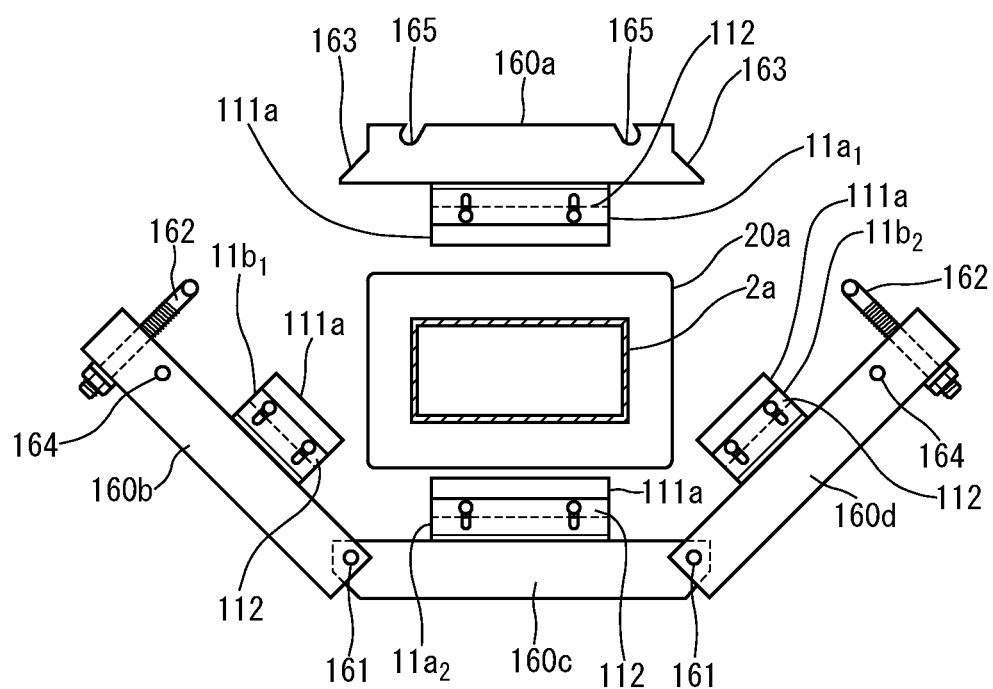
FIG. 7 is a plan view illustrating a modification of the waveguide connecting apparatus.

FIG. 7 is a plan view illustrating a modification of the waveguide connecting apparatus 1000 according to the embodiment. This modification shows a waveguide connecting apparatus 1000 that has fastening units different from those of the above-described embodiment.

This modification has a configuration in which four frame pieces 160a to 160d to which the above-described clamp pieces $11a_1$, $11b_1$, $11a_2$, and $11b_2$ are respectively attached are positioned on four sides of the rectangular flanges 20 that oppose each other, such that the abutting members 111 of the clamp pieces 11 face the flanges 20, the clamp pieces $11a_1$ and $11a_2$ oppose each other, the clamp pieces $11b_1$ and $11b_2$ oppose each other, one end of each of the two frame pieces 160b and 160d that oppose each other of the four frame pieces 160 is coupled to another frame piece 160c so as to be pivotable about a coupling shaft 161, and the other end, which is not coupled to the frame piece 160c, of each of the two frame pieces 160b and 160d, is coupled and fastened to the frame piece 160a, using fastening units that each include a T bolt 162 and a cutout portion 165 that is provided in the frame piece 160*a* and engages with the head of the T bolt 162. Also, inclined faces 163 are formed at both ends of the frame piece 160*a*, and rods 164 that abut against the inclined faces and press the frame pieces 160*a* to 160*d* toward the center of the waveguides 2 are provided in the frame pieces 160*b* and 160*d*.

In this modification, as in the above-described embodiment, the pair of butting members of each clamp piece 11 sandwich the two flanges 20 that are positioned so as to oppose each other such that the waveguides 2 are in communication with each other, and the T bolts 162 respectively engage with the cutout portions 165 and the T bolts 162 are fastened. Thus, the rods 164 press the inclined faces 163 at both ends of the frame piece 160*a*. As a result, the clamp pieces 11 sandwich the flanges 20, and thus the waveguides 2 can be connected to each other.

Note that, in the above-described waveguide connecting apparatus 1000, instead of the fastening units 12, it is possible to employ, for example; fastening units that each includes a rod (not shown) that is provided with a rack gear instead of the screw 122; a ratchet mechanism (not shown) that is attached to the frame 121 or the like, engages with the rack gear, and restricts the rod from moving outward of the frame 121; and a pressing unit that presses the rod inward of the frame 121, such as a lever (not shown) or a pinion gear (not shown) attached to the frame 121 or the like.

Modification 4

The above embodiment describes an example in which the two waveguides 2 that are to be connected to each other are rectangular waveguides that each have a flange. However, the present invention is applicable to cases in which waveguides other than rectangular waveguides are to be connected to each other, provided that each waveguide has a flange. For example, the present invention is applicable to a case where circular waveguides that each have a flange and each have a circular cross section are to be connected.

Also, although the above embodiment describers a waveguide connecting apparatus 1000 that includes two connecting clamps 1, the waveguide connecting apparatus 1000 according to the present invention need only include one or more connecting clamps 1. For example, only one connecting clamp 1 may be sufficient to connect the waveguides 2 to each other with sufficient strength or the like. In such a case, it is possible to employ a waveguide connecting apparatus 1000 that includes only one connecting clamp 1. Also, in such a case, the frame 121 or the like that holds the pair of clamp pieces 11 such that the pair of clamp pieces 11 oppose each other to sandwich the flanges 20 that oppose each other may have a substantially C shape in plan view such that the frame 121 or the like can be fitted onto the waveguides 2. Also, for example, in a case where the waveguides 2 that are to be connected to each other are circular waveguides and the flanges 20 are also circular in plan view, a waveguide connecting apparatus 1000 that includes three or more connecting clamps 1 may be employed to connect the waveguides 2.

Figure 8:
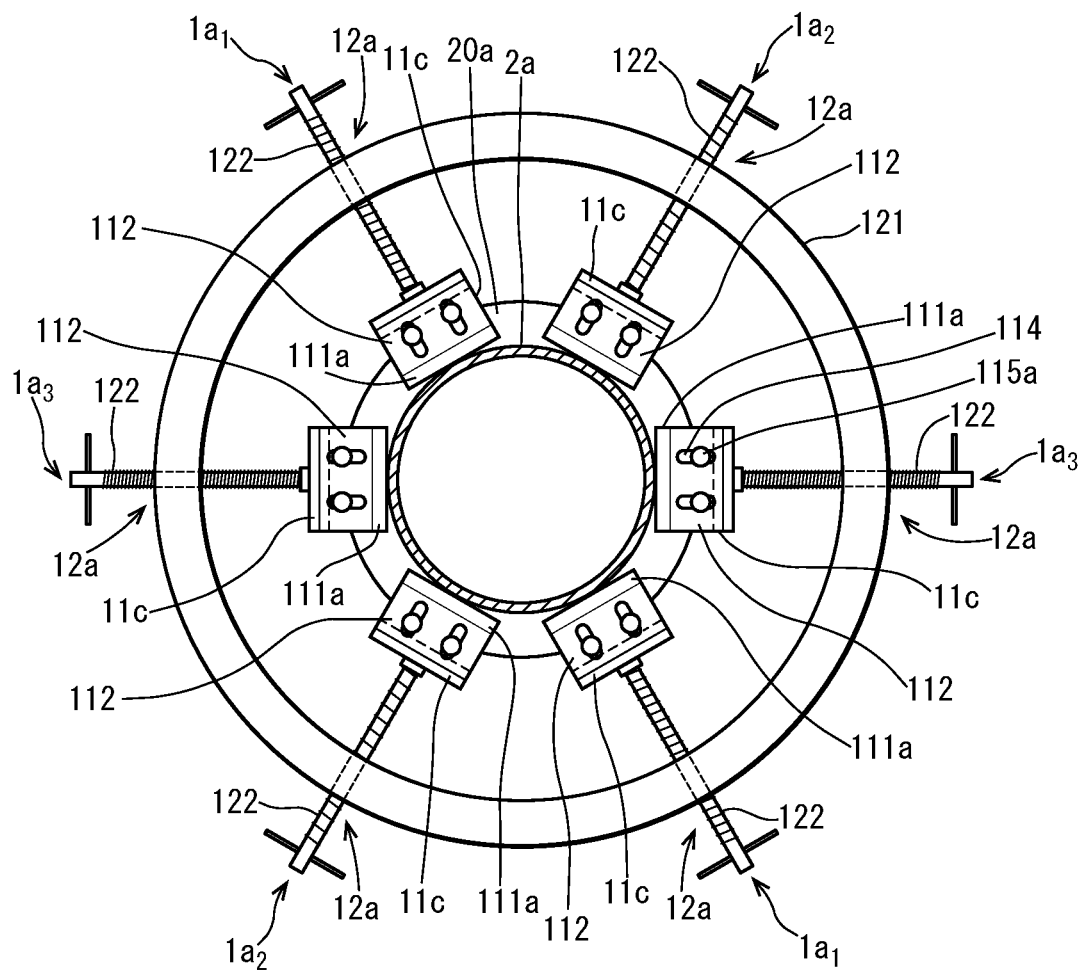
FIG. 8 is a perspective view illustrating a modification of the waveguide connecting apparatus.

FIG. 8 is a plan view showing an example of a waveguide connecting apparatus that includes three connecting clamps 1, for connecting a pair of circular waveguides to each other. In the example described here, the pair of waveguides 2 that are to be connected to each other are waveguides that have a circular cross section, and their respective flanges 20 are circular in plan view. Here, for the sake of description, the three connecting clamps 1 are referred to as connecting clamps $1a_1$ to $1a_3$. The three connecting clamps $1a_1$ to $1a_3$ are each constituted by a pair of clamp pieces 11*c* that can be pressed against each other using a screw 122. Each pair of clamp pieces 11*c* are positioned such that the clamp pieces 11*c* that constitute the pair oppose each other. The clamp pieces 11*c* have a configuration similar to that of the above-described clamp pieces 11. The screws 122 and the clamp pieces 11*c* are connected in the same manner as the screws 122 and the second clamp pieces $11a_2$ in the above-described embodiment, for example. Also, the three connecting clamps $1a_1$ to $1a_3$ are positioned such that directions in which their respective pairs of clamp pieces 11*c* oppose each other intersect with each other at an angle of substantially 60°. Also, in this example, a frame 121 that has a circular shape in plan view is employed. The screws 122 are fitted into a plurality of screw holes 1211 that penetrate through the side face of the frame 121. In this example, screws 122 that are attached to a pair of clamp pieces 11*c* included in each of the connecting clamps $1a_1$ to $1a_3$, the frame 121, and so on constitute a fastening unit 12*a*. According to this modification, the flanges 20 can be fastened by pressing the clamp pieces 11*c* using the fastening unit 12*a*. The waveguides 2 that are to be connected to each other have a circular cross section, and therefore the second faces 1112 of the abutting members 111 may be curved faces that extend along the side faces of the waveguides 2 that are to be connected. The width of the clamp pieces 11*c*, i.e. the length of the abutting members 111 in the widthwise direction is set such that each clamp piece 11*c* is not in contact with clamp pieces 11*c* that are adjacent thereto. Although a case in which three connecting clamps 1 are used is described here, four or more connecting clamps 1 may be used.

Note that a connecting clamp 1 described in the embodiment may be used as a single clamp for connecting waveguides to each other. For example, a connecting clamp 1*a* that includes the above-described first clamp piece $11a_1$, second clamp piece $11a_2$, and a fastening unit 12*a* may be used as a single waveguide connecting clamp. In this case, for example, as in the above-described embodiment, the first clamp piece $11a_1$ may be fixed to the frame 121, and the second clamp piece $11a_2$ may be configured to be able to be pressed toward the flanges 20 of the waveguides 2 using a screw 122 or the like. Also, as with the second clamp piece $11a_2$, the first clamp piece $11a_1$ may be configured to be able to be pressed toward the flanges 20 of the waveguides 2 using a screw 122 or the like. In this case, the frame 121 may be a C-shaped frame. Also, in this case, at least one end, in the widthwise direction, of each of the two abutting members 111 of at least one of the pair of clamp pieces 11*a* may have, in plan view, a curved face that curves along a portion of one or two side faces of the waveguides 2 that are rectangular waveguides that are to be connected to each other, the one or two side faces being adjacent to a side face against which the second faces 1112 of the abutting members 111 abut. Note that, in this case, the curved portion also has a first face 1111. With such a configuration, in addition to a side face-side portion of the flanges 20 of the pair of waveguides 2, against which the second faces 1112 of the abutting members 111 abut, a side face-side portion that is adjacent to this side face can also be sandwiched between the abutting members 111. Therefore, it is possible to more reliably connect the waveguides 2 to each other using one connecting clamp 1*a*.

The connecting clamp 1 described in the embodiment may be used as a portion of another waveguide connecting apparatus. For example, a connecting clamp 1 may be used to connect one side of two flanges 20 that oppose each other, and the opposite side thereto, of two rectangular waveguides 2, and the other sides may be fastened using screws or the like. Also in such a case, work can be reduced regarding portions where the connecting clamp 1 is used to connect the waveguides.

As a matter of course, the present invention is not limited to the above-described embodiments and may be variously modified, and such modifications are also included in the scope of the present invention.

INDUSTRIAL APPLICABILITY

As described above, a waveguide connecting apparatus and so on according to the present invention are suitable as an apparatus and so on for connecting waveguides to each other, and in particular, are useful as an apparatus and so on that detachably connect waveguides to each other.

The invention claimed is:

1. A waveguide connecting apparatus that connects a pair of waveguides that respectively have flanges at ends, such that the flanges oppose each other, the waveguide connecting apparatus comprising:
   two waveguide connecting clamps, each comprising:
   a pair of clamp pieces positioned so as to oppose each other and sandwich outer peripheral portions of the flanges that are positioned so as to oppose each other such that the pair of waveguides are in communication with each other; and
   a fastener that presses the pair of clamp pieces against the outer peripheral portions of the flanges,
   wherein each clamp piece of the pair of clamp pieces comprises:
   a pair of abutting members positioned so as to sandwich the flanges that are positioned so as to oppose each other, from faces that are on the opposite side of faces that oppose each other, the pair of abutting members respectively comprising:
   first faces that are to abut against the faces that are on the opposite side,
   second faces that are to abut against side faces of the waveguides, and
   third faces that are to serve as tapered faces of the flanges on the opposite side of the faces that oppose each other; and
   a pressing member with a substantially V-shaped cross section, comprising two inclined faces that engage with the respective third faces of the pair of abutting members, and holding the pair of abutting members such that the pair of abutting members are respectively movable in directions of inclination of the two inclined faces with which the pair of abutting members respectively engage, and
   the two waveguide connecting clamps are positioned such that directions in which the pairs of clamp pieces of the clamps oppose each other intersect each other.

2. The waveguide connecting apparatus according to claim 1,
   wherein each inclined face of the two inclined faces of the pressing member has one or more penetrating grooves that extend in the direction of inclination of the inclined face,
   the third faces of the pair of abutting members are respectively provided with rod-shaped members that penetrate through the one or more penetrating grooves,
   the rod-shaped members are provided with anti-fall structures that are positioned on the opposite side relative to the pair of abutting members and prevent the rod-shaped members from falling off the one or more penetrating grooves, and
   the pair of abutting members of the pair of clamp pieces are held by the pressing member so as to be movable due to the one or more penetrating grooves and the rod-shaped members that have the anti-fall structures.

3. The waveguide connecting apparatus according to claim 1,
   wherein each clamp piece of the pair of clamp pieces further comprises a biasing unit that biases the pair of abutting members outward of the pressing member.

4. The waveguide connecting apparatus according to claim 1, further comprising:
   a frame positioned so as to surround the flanges,
   wherein the fastener of each of the two waveguide connecting clamps has a screw that pushes out at least one of the pair of clamp pieces of the waveguide connecting clamp via the frame.

5. The waveguide connecting apparatus according to claim 1,
   wherein the two waveguide connecting clamps are positioned such that directions in which the pairs of clamp pieces of the clamps oppose each other are substantially orthogonal to each other.

6. The waveguide connecting apparatus according to claim 1,
   wherein at least one of: the third faces of the abutting members; and the inclined faces of the pressing member, which engage with the third faces of the abutting members, are made of polytetrafluoroethylene.

7. A waveguide connecting clamp for connecting a pair of waveguides that respectively have flanges at ends, such that the flanges oppose each other, the waveguide connecting clamp comprising:
   a pair of clamp pieces positioned so as to oppose each other and sandwich outer peripheral portions of the flanges that are positioned so as to oppose each other such that the pair of waveguides are in communication with each other; and
   a fastener that presses the pair of clamp pieces against the outer peripheral portions of the flanges,
   wherein each clamp piece of the pair of clamp pieces comprises:
   a pair of abutting members positioned so as to sandwich the flanges that are positioned so as to oppose each other, from faces that are on the opposite side of faces that oppose each other, the pair of abutting members respectively comprising:
   first faces that are to abut against the faces that are on the opposite side,
   second faces that are to abut against side faces of the waveguides, and
   third faces that are to serve as tapered faces of the flanges on the opposite side of the faces that oppose each other; and
   a pressing member with a substantially V-shaped cross section, comprising two inclined faces that engage with the respective third faces of the pair of abutting members, and holding the pair of abutting members such that the pair of abutting members are respectively movable in directions of inclination of the two inclined faces with which the pair of abutting members respectively engage.

* * * * *